Patented May 5, 1953

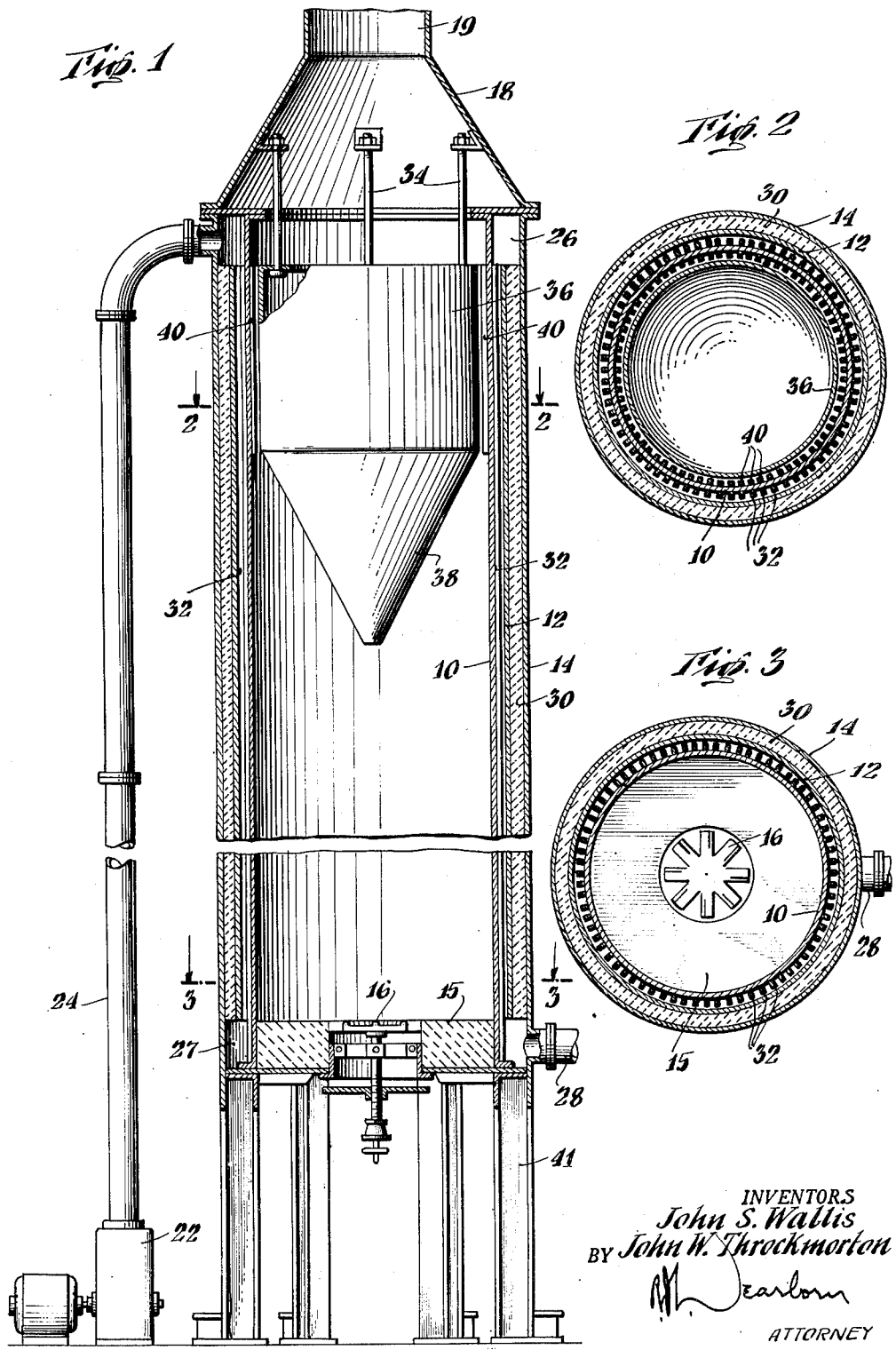

2,637,314

UNITED STATES PATENT OFFICE 2,637,314

FORCED DOWNWARD AIR FLOW AIR-HEATING FURNACE

John S. Wallis and John W. Throckmorton, New York, N. Y., assignors to Petro-Chem Process Company, Inc., New York, N. Y., a corporation of Delaware Application July 3, 1952, Serial No. 296,986

1 Claim. (Cl. 126—110)

Our invention relates to that type of vertical heaters which have a hollow cylindrical combustion chamber with one or more burners which set up an axial flame and are composed of radiant and convection sections. More specifically, this invention relates to improvements in air or gas heaters which are particularly adapted for industrial uses where large quantities of air or other gas must be heated to temperatures which may be varied over a wide range from moderate temperatures to temperatures beyond the usual requirement of air heaters. The heaters of our invention are particularly well adapted for such uses as the drying of foods, the revivification of catalysts and the supplying of large quantities of air at controlled temperatures for wind tunnels.

Applicants have been working for many years in the field of vertical tube oil heaters and boilers having tall cylindrical furnaces with a circular bank of tubes near the cylindrical wall of the combustion chamber and a centrally located axial burner or burners at the bottom and adapted to produce a central axial flame of great intensity from which the heat is transferred to the circular bank of tubes throughout a large part of the length of the cylindrical furnace, primarily by radiation, combined with an upper section formed by an internal cylindrical baffle with a conical lower end adapted to force the combustion gases around and in contact with the surface of the vertical tubes, but only near their upper ends (see for example Throckmorton and Wallis Patent 2,276,527, Fig. 1).

Our present invention has made use of several advantageous features of the oil heater furnace in the production of a relatively simple compact air heater which is novel and commercially superior to those hitherto made.

For example, in the design and construction of oil heaters hundreds of which have gone into commercial use, applicants have discovered that only a single row of tubes near the circumference of the tall and large cylindrical combustion chamber is required because of the marked efficiency of the heat transfer from the extremely hot axial flame to the tubes by radiation. Economics are gained by passing the hot gases near the upper end of the furnace around and among the tubes so that a large additional quantity of heat is extracted by convection.

The heating of air and gas creates a problem which is quite distinct from the heating of oil and water because the gaseous material will not absorb heat from tubes or walls as readily as liquid and great care is necessary to avoid burning out the walls through which the heat is transferred to the air or to the gas to be heated.

Many of the advantages of our vertical tube oil heaters and boilers have been retained in the structure which is illustrated in the accompanying drawings and described in detail in the following paragraphs.

Fig. 1 is an elevation largely in cross-section of the heater construction.

Fig. 2 is a horizontal section near the upper end of the furnace taken along the line 2—2 of Fig. 1 in the direction of the arrows.

Fig. 3 is a horizontal section near the lower end of the furnace taken along the line 3—3 of Fig. 1 in the direction of the arrows.

Referring to the drawings, the relatively tall heater (shown broken away to save space) comprises a vertical tubular heat exchange shell 10 surrounded by an outer casing composed of the exterior shell of the furnace 14 and an inner concentric shell 12, the space between the two shells being packed with heat insulating material 30. The size of the casing is such that the shell 12 surrounds the heat exchange shell 10 in closely spaced concentric relationship, leaving a narrow annular space between the two.

The space within the heat exchange shell forms an open combustion chamber with a heavily insulated circular bottom plate 15 in the center of which is located an up-shot burner 16. The top of the furnace is completed by a breeching 18 and a stack 19.

The air or other gas to be heated is supplied by a motor driven blower 22 through conduit 24 and is discharged into an annular intake manifold 26 at the top of the annular space between shells 10 and 12. The annular space where the air or gas is heated opens at the bottom into an annular discharge manifold 27 which is connected to an outlet 28, through which the hot air or gas is discharged. The insulation 30 is adequate to prevent any substantial loss of heat through the outer walls of the heater and the inner surface of the shell 12 is smooth to minimize friction to the flow of air and gas through the annular space.

The inner surface of the shell 10 is smooth so as to avoid its being damaged, roughened or subject to hot spots throughout the greater part of its length where the extremely hot axial flame from the burner 16 transmits heat to the surface by radiation and thus forms the radiant section of the furnace. The entire outer surface of the shell 10 is formed with closely spaced vertical fins 32, which constitute an extended surface into which the air or gas to be heated is brought into close and intimate contact, as clearly shown in Figs. 1, 2 and 3.

In the upper portion of the combustion chamber, suspended from breeching 18 by hangers 34, is a baffle comprising an upper cylindrical portion 36 which fits concentrically into the upper end of the shell 10 and is spaced therefrom by a narrow annulus and a lower conical portion 38, which projects downwardly into the radiant section of the heater. The combustion gases give up a substantial part of their heat by radiation before they reach the narrow annulus around the baffle 36 and in order that a maximum amount of heat may be absorbed from the hot gases before they pass into the breeching and up the stack, the shell 10 is provided on its inner surface near its upper end only with fins 40, which are adapted to take up heat by convection.

This upper section of the heater where the baffle 36 is located constitutes the convection section of the furnace.

In operation the flame extends axially upwards from the up-shot burner 16 and while the temperature of the flame is very intense, the heat is absorbed by the smooth shell 10 by radiation and thus the furnace shell is not damaged.

When the hot gases from the flame are somewhat reduced in temperature, they then contact the fins 40 near the upper end of the shell 10 without burning them out.

The air or gas to be heated is in contact with a very large extended surface throughout the entire length of its passage around the shell 10 because of the fins 32, and the manifold 26 is relatively large and the air or gas is under pressure from the fan or blower 22, so that it is well distributed and flows downwardly around the shell 10 into the outlet manifold 27 and thence to the outlet 28.

The heat exchange element, which is composed of the inner shell 10 and the outer wall, which is made up of the shell 14, constitute the body of the furnace on which the breeching 18 is mounted at the top.

The furnace is supported at a substantial height above the floor level by I beams 41 so as to give ready access to the burner 16.

Thus the furnace is peculiarly well adapted to heat air or gas although the normal heat transfer rate of gases is low, without danger of burning out the inner walls of the combustion chamber since they are smooth and readily absorb heat by convection from the furnace gases after they have already passed through the relatively tall radiant zone.

This application is a continuation-in-part of our co-pending application Serial Number 58,704, filed November 6, 1948, which is now abandoned.

The structure shown and described herein is illustrative of our invention and the scope of the invention is only to be limited by the claim.

We claim:

An air heater having a radiant heating zone and a convection heating zone comprising a pair of closely spaced concentric hollow elongated, relatively narrow vertical cylinders located one within the other and forming a narrow annular passage for the air to be heated, a central axial burner within the inner cylinder at its lower end, an outlet stack at the top of the heater, an air inlet at the top of said narrow annular passage, an air outlet at the bottom of said narrow annular passage, extended surface means on the outside of the inner cylinder over substantially its entire length to increase the heating surface for the air to be heated, extended surface means on the inside of the inner cylinder only at the top thereof to increase the heat absorption by the inner cylinder in the convection zone, said inner cylinder having a smooth inner surface over a substantially greater portion of its length adapted to be out of contact with any flame from the burner and forming the radiant heating zone, and a relatively short cylindrical baffle located concentrically within the inner cylinder only at the top thereof and being closely adjacent said inner cylinder and forming the convection zone and having an inverted cone shaped lower extremity extending a short distance into said radiant zone.

JOHN S. WALLIS.
JOHN W. THROCKMORTON.

No references cited.